(12) United States Patent
Bauer et al.

(10) Patent No.: US 10,443,282 B2
(45) Date of Patent: Oct. 15, 2019

(54) ARTICULATING MECHANISM FOR A VEHICLE DOOR

(71) Applicant: NIO USA, Inc., San Jose, CA (US)

(72) Inventors: Ivonne Bauer, San Jose, CA (US); Geoffrey Daniel Young, San Jose, CA (US); Tom Peleg, Mountain View, CA (US); Ren Ren, San Jose, CA (US); Padmanabhan Kumar, Fremont, CA (US); Paul R. Murray, San Jose, CA (US); Shane L. Kenyon, Livermore, CA (US)

(73) Assignee: NIO USA, Inc., San Jose, CA (US)

(*) Notice: Subject to any disclaimer, the term of this patent is extended or adjusted under 35 U.S.C. 154(b) by 29 days.

(21) Appl. No.: 15/718,244

(22) Filed: Sep. 28, 2017

(65) Prior Publication Data

US 2018/0087304 A1    Mar. 29, 2018

Related U.S. Application Data

(60) Provisional application No. 62/401,612, filed on Sep. 29, 2016.

(51) Int. Cl.
| | | |
|---|---|---|
| *B60J 5/06* | (2006.01) | |
| *E05D 15/10* | (2006.01) | |
| *E05F 15/643* | (2015.01) | |
| *B60J 5/04* | (2006.01) | |
| *E05D 15/56* | (2006.01) | |

(52) U.S. Cl.
CPC .......... *E05D 15/1047* (2013.01); *B60J 5/047* (2013.01); *B60J 5/06* (2013.01); *E05D 15/101* (2013.01); *E05D 15/56* (2013.01); *E05F 15/643* (2015.01); *E05Y 2900/531* (2013.01)

(58) Field of Classification Search
CPC ... E05D 15/1047; E05D 15/101; E05D 15/56; E05D 2900/531; E05F 15/643; B60J 5/047; B60J 5/06
See application file for complete search history.

(56) References Cited

U.S. PATENT DOCUMENTS

| | | | |
|---|---|---|---|
| 4,135,760 A | 1/1979 | Grossbach | |
| 5,319,880 A | 6/1994 | Kuhlman | |
| 5,507,119 A | 4/1996 | Sumiya et al. | |
| 7,243,461 B2 | 7/2007 | Rogers, Jr. et al. | |
| 7,611,190 B1 * | 11/2009 | Elliott | B60J 5/06 296/146.12 |
| 7,798,557 B2 | 9/2010 | Elliott et al. | |
| 7,950,719 B2 | 5/2011 | Elliott et al. | |
| 8,511,738 B2 | 8/2013 | Brown et al. | |
| 2007/0194599 A1 | 8/2007 | Paton et al. | |

OTHER PUBLICATIONS

International Search Report and Written Opinion for International (PCT) Patent Application No. PCT/US17/53871, dated Nov. 30, 2017, 8 pages.

* cited by examiner

*Primary Examiner* — Lori L Lyjak
(74) *Attorney, Agent, or Firm* — Sheridan Ross P.C.

(57) ABSTRACT

An articulating mechanism for opening and closing a vehicle door utilizes a first mechanism having a first motion profile and a second mechanism having a second motion profile. To open the door, the first mechanism begins the first motion profile before the second mechanism begins the second motion profile. To close the door, the second mechanism completes the second motion profile before the first mechanism completes the first motion profile.

20 Claims, 11 Drawing Sheets

ARTICULATING MECHANISM FOR A VEHICLE DOOR

CROSS-REFERENCE TO RELATED APPLICATIONS

The present application claims the benefits of and priority, under 35 U.S.C. § 119(e), to U.S. Provisional Application Ser. No. 62/401,612, filed on Sep. 29, 2016, entitled "Articulating Mechanism for a Vehicle Door." The entire disclosure of the foregoing application is hereby incorporated by reference, in its entirety, for all that it teaches and for all purposes.

FIELD

The present disclosure is generally directed to vehicle doors, and more particularly to vehicle doors that translate outward and slide forward or backward.

BACKGROUND

Sliding side vehicle doors are known. However, current designs are complex and limited in their applicability. For example, some current designs utilize connection mechanisms near the vehicle floor. However, this type of connection is not well-suited for use in an electric vehicle which stores a battery below the vehicle floor. Other designs use externally visible tracks or rollers which are not visually appealing or applicable to smaller vehicles.

U.S. Pat. No. 7,243,461, entitled "Hinge Mechanism for a Sliding Door," describes a hinge assembly for coupling a sliding door of a vehicle to a drive unit for sliding the sliding door from an open position to a closed position, where the drive unit causes the hinge assembly to slide within a guide track as the door moves between an open position and a closed position. U.S. Pat. No. 7,950,719, entitled "Vehicle Dual Hinge Rear Door Articulating and Sliding System," describes a vehicle rear door articulating and sliding mechanism which includes an articulating hinge assembly having a hinge arm pivotally mounted to a vehicle C-pillar at one end thereof, a vehicle rear door pivotally and slideably mounted to the hinge arm at an opposite end of the hinge arm, and a guide arm attached to the vehicle rear door and slideably engaged with a guide track mounted to a vehicle roof, which function together to rotate a sliding door and move the door into an open position. U.S. Pat. No. 7,798,557, entitled "Vehicle Unguided Four-Bar Rear Door Articulating and Sliding Mechanism," describes a vehicle rear door articulating and sliding mechanism comprising a four-bar mechanism of unequal arm lengths, pivotally connected at one end to the C-pillar of a vehicle body and at the other end to the vehicle rear door, where the vehicle rear door is configured to slide backward relative to the vehicle body once the four-bar mechanism is extended, and wherein the vehicle rear door rotates as it is moved into the open position. U.S. Pat. No. 8,511,738, entitled "Dual Hinged Vehicle Door," describes a dual hinged door assembly for a vehicle that includes an upper door portion and a lower door portion.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
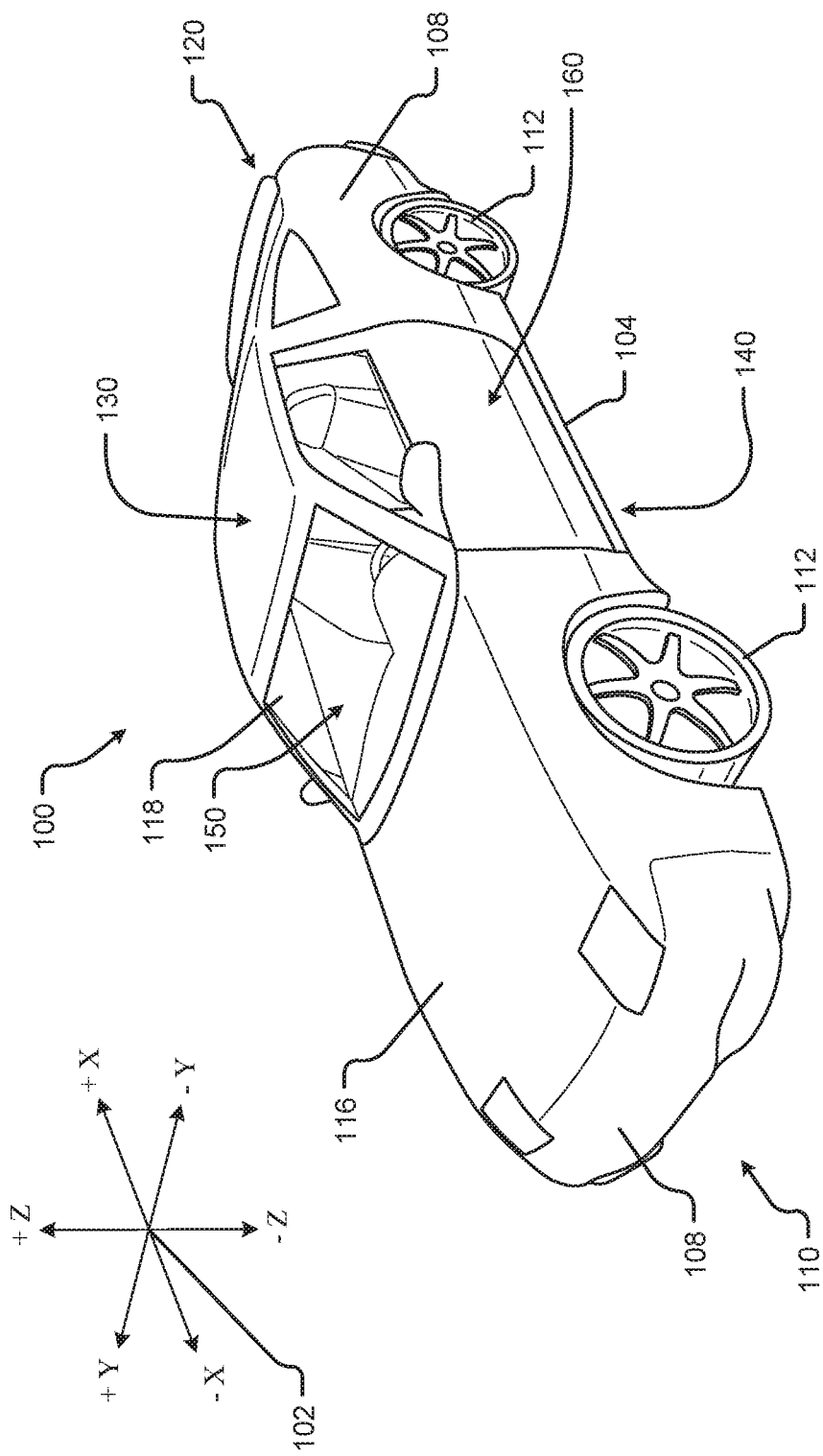
FIG. 1 shows a vehicle in accordance with embodiments of the present disclosure.
Figure 2A:
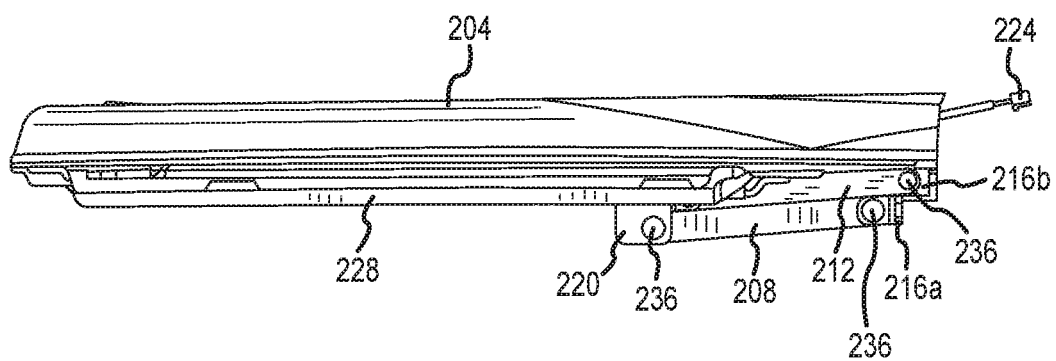
FIG. 2A shows a top view of an articulating mechanism for a vehicle door according to one embodiment of the present disclosure, in a first position.
Figure 2B:
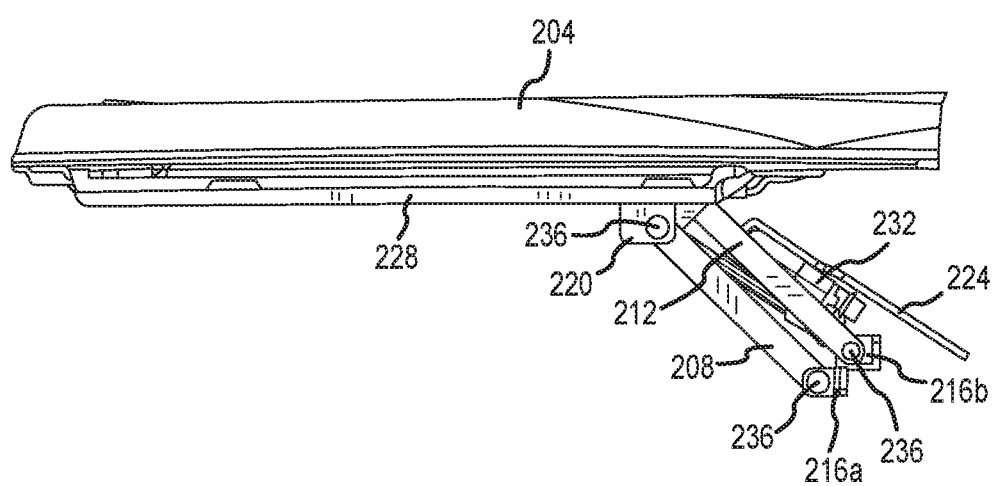
FIG. 2B shows a top view of the articulating mechanism for a vehicle door of FIG. 2A, in a second position.
Figure 2C:
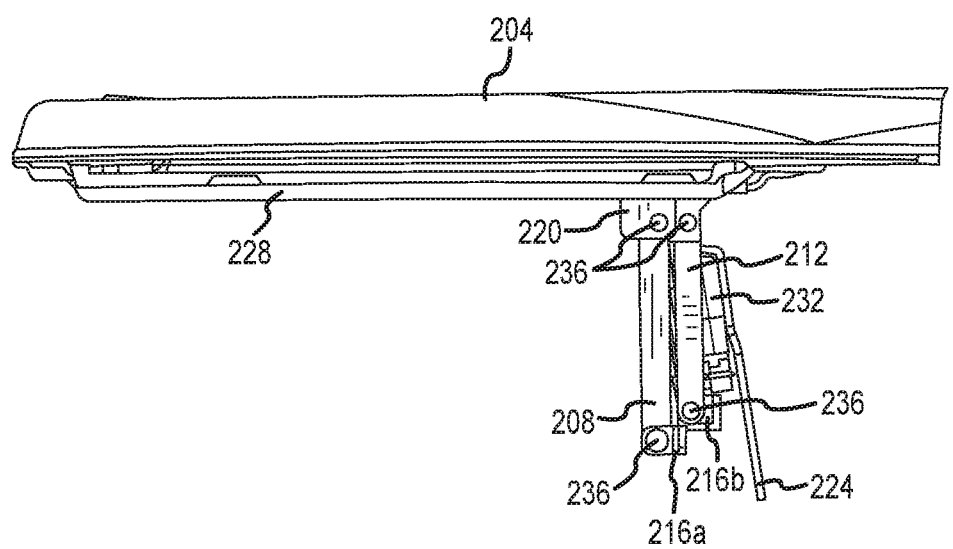
FIG. 2C shows a top view of the articulating mechanism for a vehicle door of FIG. 2A, in a third position.
Figure 2D:
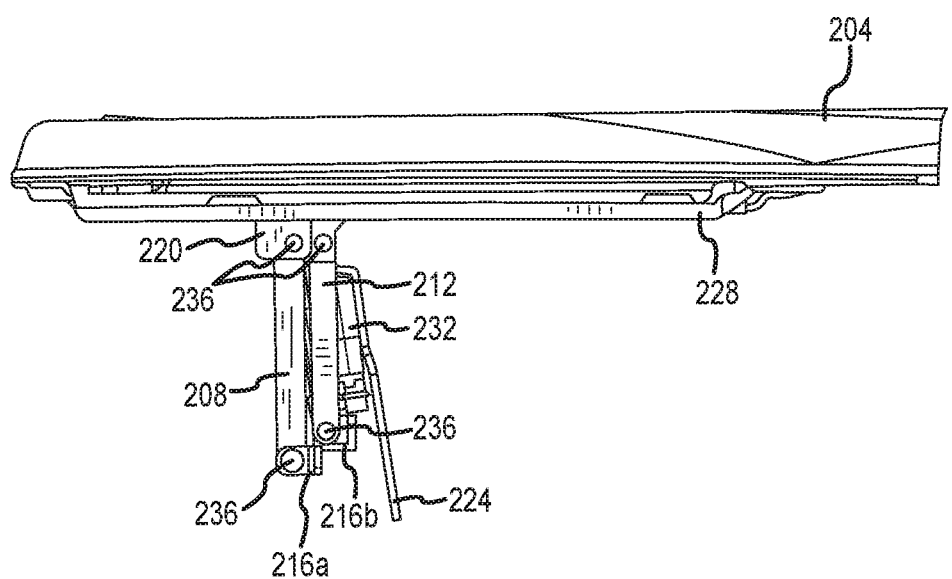
FIG. 2D shows a top view of the articulating mechanism for a vehicle door of FIG. 2A, in a fourth position.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component. Similarly, forward movement refers to movement in the −X direction, and backward movement refers to movement in the −X direction. The axes of the coordinate system 102 are referenced throughout this description.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Referring now to FIGS. 2A-2D, a vehicle door 204 of a vehicle such as the vehicle 100 may be provided with an articulated mechanism for opening and closing the door 204. The articulated mechanism may comprise, for example, a supporting member 208 and an aligning member 212. The supporting member 208 may be pivotably connected, with a pivot pin 236, to a frame bracket 216a at one end, and may also be pivotably connected, again with a pivot pin 236, to a door bracket 220 at the other end. The aligning member 212 may likewise be pivotably connected, with a pivot pin 236, to a frame bracket 216b at one end, and may also be pivotably connected, again with a pivot pin 236, to the door bracket 220 at the other end. The frame brackets 216a and 216b may be, for example, affixed to a structural member of a vehicle frame of the vehicle 100, such as an A-pillar, a B-pillar, a C-pillar, or a D-pillar. Although the frame brackets 216a and 216b are depicted as separate brackets having a fixed position relative to each other, the frame brackets 216a and 216b may be replaced by a single bracket pivotably connectable to both the supporting member 208 and the aligning member 212. In some embodiments, the structural member of a vehicle 100 that will support the door 204 is provided with connection points for a pivotable connection with the supporting member 208 and the aligning member 212, such that separate frame brackets 216a and 216b are not needed. For example, the supporting member 208 and the aligning member 212 may each be pivotably connected directly to the A-pillar or another pillar of a vehicle 100.

With the frame brackets 216a and 216b fixedly positioned proximate each other (or replaced with a single frame bracket, or with a vehicle pillar configured for pivotable connection to the supporting member 208 and the aligning member 212), the frame brackets 216a-b (or the single frame bracket, or the vehicle pillar), together with the supporting member 208, the door bracket 220, and the aligning mechanism 212, form a four-bar mechanism that allows the door 204 to move towards and away from the vehicle in the +Y/−Y direction (while necessarily moving also in the +X/−X direction, as the supporting member 208 and the aligning member 212 rotate about the pivot pins 236 securing them to the frame brackets 216a and 216b). Moreover, as evident from FIGS. 2A-2C (which show the translation of the door 204 as the supporting member 208 and aligning member 212 rotate about their respective pivotable connections with the frame brackets 216a and 216b), the use of a four-bar mechanism beneficially ensures that an orientation of the vehicle door 204 remains substantially constant (e.g., the vehicle door 204 remains parallel to vehicle 100, aligned in the +X/−X direction) as the position of the door 204 changes (e.g., as the vehicle door 204 moves toward and away from the vehicle 100). Other mechanisms or linkages may also be used to ensure that the orientation of the vehicle door 204 remains substantially constant. The present disclosure also encompasses, however, embodiments in which the 4-bar mechanism is configured to control the orientation of the vehicle door 204 but not in a manner that maintains the vehicle door 204 parallel with the vehicle 100. And, in some embodiments, other mechanisms or linkages may be used to control the orientation of the vehicle door 204 even if that orientation does not remain substantially constant (whether parallel to the vehicle 100 or otherwise).

As depicted in FIGS. 2A-2D, the supporting member 208 is substantially larger than the aligning member 212. Indeed, the supporting member 208 of FIGS. 2A-2D is configured to support most if not all of the weight of the door 204 when the door 204 is in an open position (e.g., when the supporting member 208 has rotated to move the door 204 away from the vehicle 100). The supporting member 208 may be manufactured as a single piece, or the supporting member 208 may comprise a plurality of pieces that were manufactured separately but joined together using any known joining process, method, or technique (including, for example, using welding or mechanical fasteners). Some or all of the supporting member 208 may be manufactured from metal, such as steel or aluminum. Some or all of the supporting member 208 may also be manufactured from a composite material, such as carbon-fiber laminate, or from plastic.

In the embodiment of FIGS. 2A-2D, the aligning member 212 serves primarily to maintain the alignment of the door 204 in the +X/−X direction (e.g., to maintain a constant orientation of the door 204 relative to the vehicle frame), regardless of the position of the vehicle door 204, and provides little if any weight-bearing support to the door 204. In other embodiments, the aligning member 212 may be designed and configured to provide at least some weight-bearing support to the vehicle door 204, and may even be of approximately equal structural capacity to the supporting member 208 (so that the weight of the door system is distributed approximately evenly between the supporting member 208 and the aligning member 212). Like the supporting member 208, the aligning member 212 may be manufactured as a single piece, or the aligning member 212 may comprise a plurality of pieces that were manufactured separately but joined together using any known joining process, method, or technique (including, for example, using welding or mechanical fasteners). Some or all of the aligning member 212 may be manufactured from metal, such as steel or aluminum. Some or all of the aligning member 212 may also be manufactured from a composite material, such as carbon-fiber laminate, or from plastic. The aligning member 212 may be substantially less strong than the supporting member 208.

Also shown in FIGS. 2A-2D is a rail 228 to which the door bracket 220 is slideably connected. As a result, the door 204 can slide forward and backward on the rail 228 once the supporting member 208 and the aligning member 212 have rotated sufficiently to allow the door 204 to clear the sidewall of the vehicle 100. In the embodiment of FIGS. 2A-2D, the door 204, when being opened, first translates away from the vehicle 100 as the supporting member 208 and the aligning member 212 rotate relative to the frame brackets 216a, 216b, and then slides forward or backward, as appropriate, to move the door 204 out of the doorway normally occupied by the door 204. With the door 204 slid away from the doorway, the door 204 will not block passenger ingress or egress, or the loading or unloading of cargo from the vehicle 100. When the door 204 closes, the door 204 first slides in an opposite direction as before back to its original position along the rail 228, and then the supporting member 208 and aligning member 212 rotate to move the door 204 back toward the vehicle frame and into the doorway, thus bringing the door 204 into the closed position.

Although not shown in FIGS. 2A-2D, the door 204, and more specifically the perimeter of the door 204, may be provided with one or more locking features that engage or are engaged by complementary locking features on the vehicle 100, so as to secure the door 204 in the closed position during operation of the vehicle 100 or as otherwise desired for safety and/or security purposes. The vehicle door 204 (and/or the articulated mechanism for opening and closing the door 204) may also comprise one or more locking features for locking the door 204 in the open position. Such locking features may include, for example, pins, latches, and/or over-travel stops. One or more of these features may be configured, for example, to stabilize the motion, or to restrict or prevent the relative motion, between or among the members of the 4-bar mechanism; between the 4-bar mechanism and the structural frame of the vehicle 100; between the 4-bar mechanism and the door 204; between the door bracket 220 and the rail 228; and/or between or among any other components that, during opening and closing of the door 204, move relative to each other. In some embodiments, one or more detents may be provided in the articulated mechanism for increasing the amount of energy needed to move the door 204 out of one or more specific positions corresponding to the location of the detents.

The present disclosure encompasses articulating mechanisms for vehicle doors having the structure described herein (or similar structure) and that are manually operated. The present disclosure also encompasses articulating mechanisms for vehicle doors as described herein that are automatically operated. The articulating mechanism depicted in FIGS. 2A-2D comprises an actuator 232 (which in turn comprises an actuator arm 224) that enables powered operation of the articulating mechanism. Consequently, the articulating mechanism of FIGS. 2A-2D is configured to open and close the door 204 automatically, whether based on user input (e.g., the pressing of a button, or the pulling or pushing of a handle, or any other input that activates a switch that causes the actuator 232 to receive power and operate the articulating mechanism) and/or based on one or more predetermined conditions (e.g., shifting the transmission of the vehicle 100 into gear may cause the actuator 232 to operate to close the door 204). The actuator 232 may be or comprise, for example, an electromechanical strut, a hydraulic cylinder, a gear system driven by an electric motor, or a belt-drive system (which may also be driven by an electric motor).

Figure 3A:
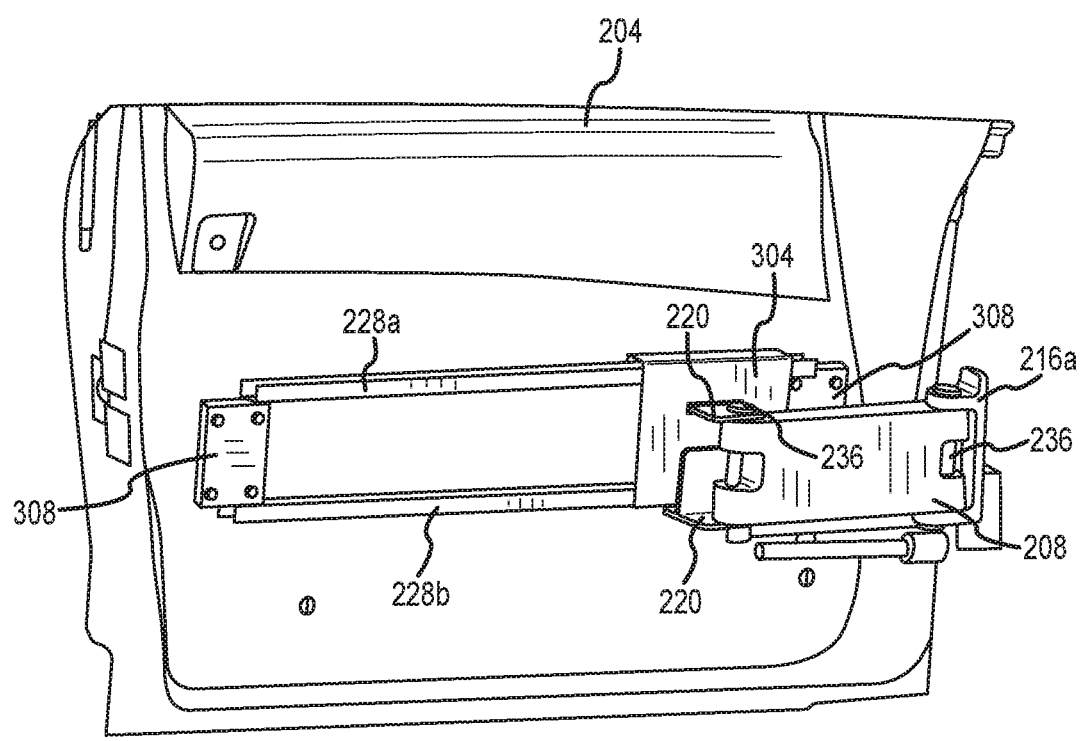
FIG. 3A shows a side view of an articulating mechanism for a vehicle door according to another embodiment of the present disclosure, in a first position.
Figure 3B:
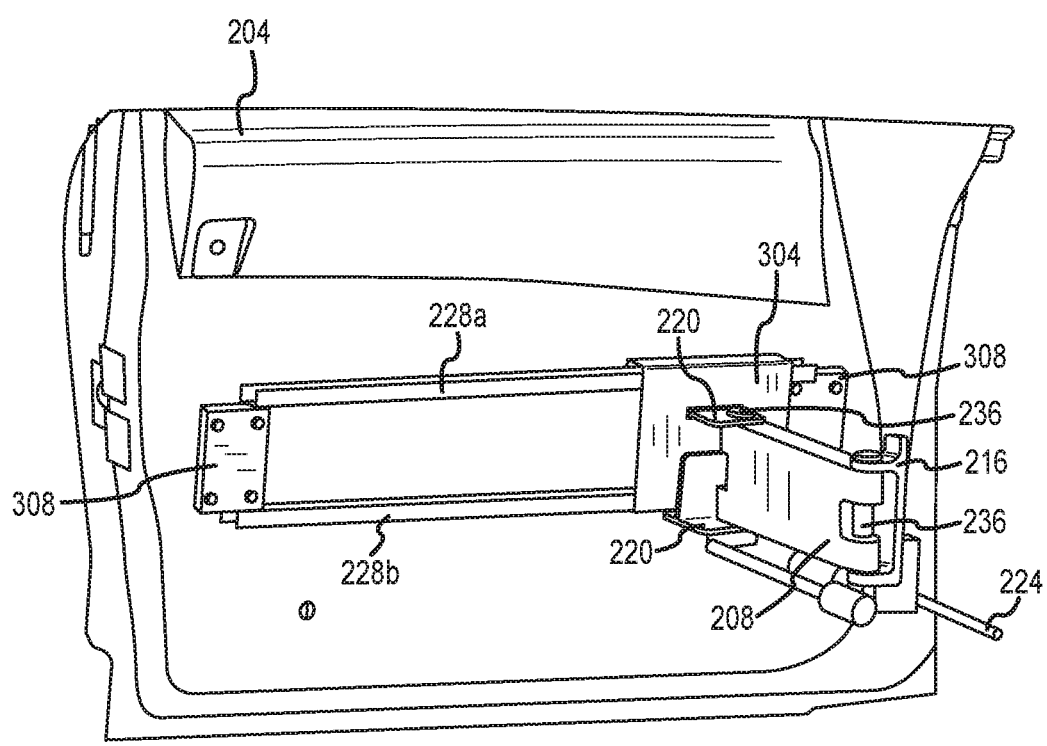
FIG. 3B shows a side view of the articulating mechanism for a vehicle door of FIG. 3A, in a second position.
Figure 3C:
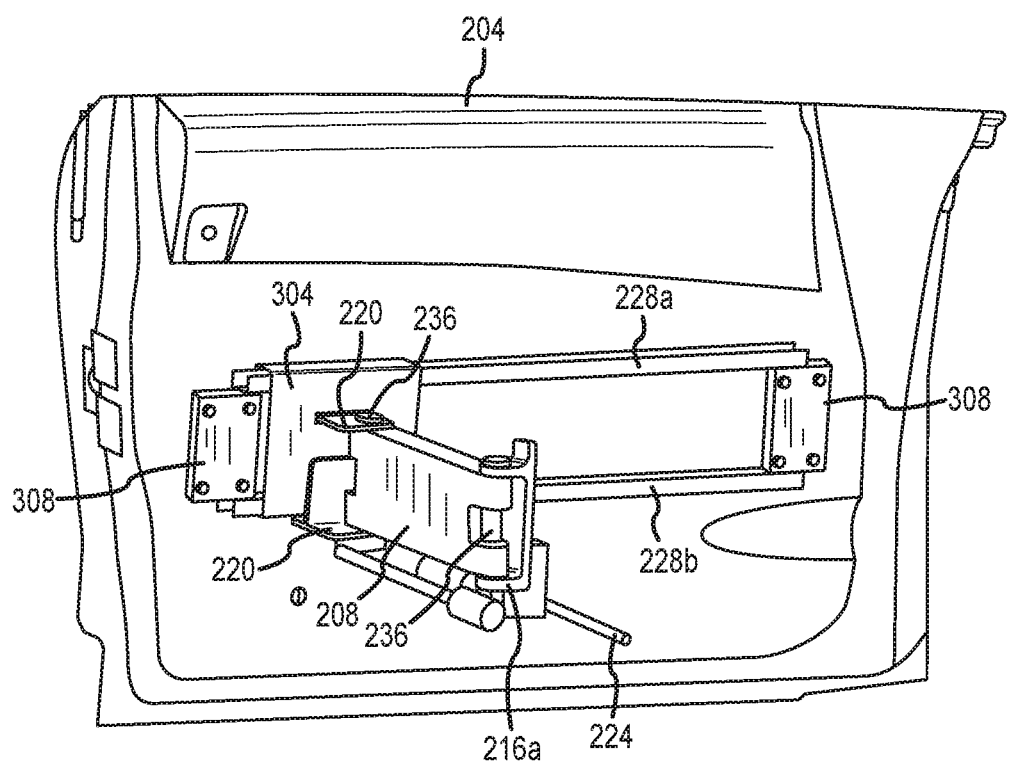
FIG. 3C shows a side view of the articulating mechanism for a vehicle door of FIG. 3A, in a third position.

Turning now to FIGS. 3A-3C, a side view of the inside of a door 204 is provided, showing a plurality of rails 228a and 228b affixed to an inner surface of the door 204 with a pair of rail brackets 308. As in the embodiment of FIGS. 2A-2D, a supporting member 208 is pivotably connected at one end to a frame bracket 216 with a pivot pin 236, and at the other end to a door bracket 220 with another pivot pin 236. The supporting member 208 blocks an aligning member 212 from view, but the articulating mechanism of FIGS. 3A-3C nevertheless comprises an aligning member 212, which as described above is pivotally connected at one end to the door bracket 220 and at the other end to the frame bracket 216, in both cases with a pivot pin 236.

Also shown in FIGS. 3A-3C is a trolley 304, to which the door bracket 220 is fixedly secured and which is slideably engaged with the rails 228a and 228b. The trolley 304 may comprise wheels, bearings, or other components that slideably engage the rails 228a and 228b, or the rails 228a and 228b may comprise wheels, bearings, or other components that slideably engage the trolley 304. In the embodiment of FIGS. 3A-3C, the rails 228a and 228b comprise a smooth track, and the trolley 304 comprises a plurality of wheels or bearings that engage the smooth track and allow the trolley 304 to slide forward and backward along the rails 228a and 228b. The rails 228a and 228b may be U-shaped, and the trolley 304 may be configured to engage one or both of the bottom portion of the U-shaped rails 228a and 228b, and the sidewall portion of the U-shaped rails 228a and 228b.

In other embodiments according to the present disclosure, the rails 228a and 228b may comprise a series of teeth, and the trolley 304 may comprise a plurality of gears for engaging the teeth and moving the trolley 304 forward and backward along the rails 228a and 228b. In still other embodiments, the rails 228a and 228b may comprise a series of wheels or bearings, and the trolley 304, which may not comprise any wheels, bearings, or other moving components, may slide over the wheels or bearings of the rails 228a and 228b.

Although FIGS. 3A-3C depict two rails 228a and 228b, in some embodiments of the present disclosure a single rail may be provided on the door 204. In other embodiments, a plurality of rails may be provided on the door 204. Further, in some embodiments, a single structure having a plurality of rails or tracks thereon may be provided on the door 204, while in other embodiments (such as the embodiment of FIGS. 3A-3C) each of a plurality of rails may be entirely separate from each other. Like the supporting member 208 and the aligning member 212, the rails 228a-b may be manufactured of metal, such as aluminum or steel; from a composite material, such as carbon-fiber laminate; and/or from plastic.

The rail brackets 308 may be or comprise any shape or configuration necessary to secure the rails 228a, 228b to the door 204. Because the full weight of the door 204 must be supported by the rails 228a, 228b, and given the moment that is exerted on the rails 228a, 228b when the door 204 is slid fully forward or fully backward, both the rails 228a, 228b and the rail brackets 308, as well as the connection between the rails 228a, 228b and the rail brackets 308 and the connection between the rail brackets 308 and the door 204, are designed with enough strength to withstand the expected forces to which they will be subjected during operation, without deforming in any way that would compromise or otherwise prevent the normal operation of the actuator mechanism. In some embodiments, the rail brackets 308 may be omitted, and the rails 228a, 228b may be fastened or otherwise affixed directly to the door 204.

FIGS. 3A-3C show a variety of positions of the actuator mechanism, which help to illustrate the distinct motion profiles of the first mechanism (e.g., the 4-bar linkage comprising the supporting member 208, the frame bracket 216, the aligning member 212, and the door bracket 220) and the second mechanism (e.g., the rails 228a, 228b and the trolley 304). FIG. 3A shows the actuator mechanism in a fully closed state, with the supporting member 208 substantially aligned with the door 204 and the trolley 304 positioned at a far end of the rails 228a, 228b. In this state, neither motion profile of either of the first and second mechanisms has commenced. FIG. 3B shows the door 204 in a partially opened state, with the supporting member 208 rotated to a fully extended position (such that the door 204 is at a maximum possible distance from the sidewall of the vehicle 100), but with the trolley 304 still positioned at the same far end of the rails 228*a*, 228*b*. In this state, the motion profile of the first mechanism (e.g., the rotation of the supporting and aligning members 208 and 212 relative to the fixed frame 216 and relative to the door bracket 220) has completed, but the motion profile of the second mechanism has not yet commenced. FIG. 3C shows the door 204 in a fully opened state, with the supporting member 208 fully extended (in the same position as in FIG. 3B), and the trolley positioned at the opposite end of the rails 228*a*, 228*b*. In this state, no further motion of the first mechanism has occurred, but the motion profile of the second mechanism (e.g., translation of the trolley 304 along the rails 228*a*, 228*b*) has completed.

While the articulating mechanism for a vehicle door according to embodiments of the present disclosure does not require completion of the motion profile of the first mechanism prior to commencement of the motion profile of the second mechanism, the motion profiles of the first and second mechanisms are sequential. More specifically, to open the door 204, the motion profile of the first mechanism commences before the commencement of the motion profile of the second mechanism, and to close the door 204, the motion profile of the second mechanism is completed before the motion profile of the first mechanism is completed.

In other words, the movement of the door 204 is sequential in nature, with the supporting member 208 and the aligning member 212 being required to first move the door 204 away from the vehicle 100 before the door 204 can freely slide forward or backward, and to slide the door 204 forward or backward into the proper position before the supporting member 208 and the aligning member 212 can move the door 204 all the way back toward the vehicle 100. At the same time, however, the operation of the articulating mechanism for the vehicle door 204 is not limited to movement between fully opened and fully closed positions. Rather, the supporting member 208 and the aligning member 212 may be used to translate the door to a plurality of positions in the +Y/−Y directions, and the door 204 may slide to any point along the rails 228*a*, 228*b* in the +X/−X directions, provided that the sidewall of the vehicle 100 does not prevent such movement.

For a vehicle 100 comprising two rows of seats (a front row and a back row), the illustrated door and articulating mechanism therefor of FIGS. 3A-3C may be installed, for example, as the front driver-side door (e.g., the front door on the −Y side of the vehicle 100), with the frame bracket 216 fixedly secured to the A-pillar of the vehicle 100 and the door 204 configured to slide forward as the door 204 is opened. Alternatively, the illustrated door and articulating mechanism therefor of FIGS. 3A-3C may be installed, for example, as the rear passenger-side door (e.g., the rear door on the +Y side of the vehicle 100), with the frame bracket 216 fixedly secured to the C-pillar of the vehicle 100 and the door 204 configured to slide backward as the door 204 is opened. The configuration of the articulating mechanism with respect to the vehicle door may easily be reversed (e.g., with the closed position of the door 204 corresponding to the trolley 304 being positioned on the opposite end of the rails 228*a*, 228*b*, and the supporting member 208, bracket 216, and corresponding components extending in the opposite direction as well) for installation in the front passenger-side and rear driver-side doorways.

Figure 4A:
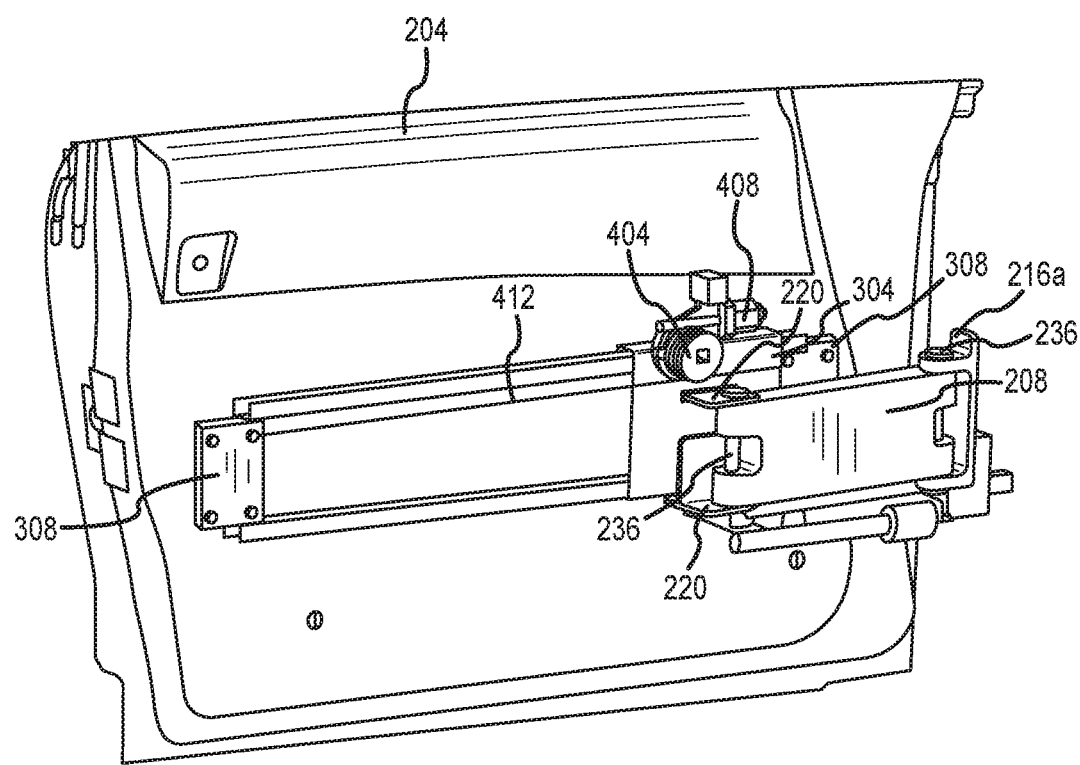
FIG. 4A shows an articulating mechanism for a vehicle door according to yet another embodiment of the present disclosure.
Figure 4B:
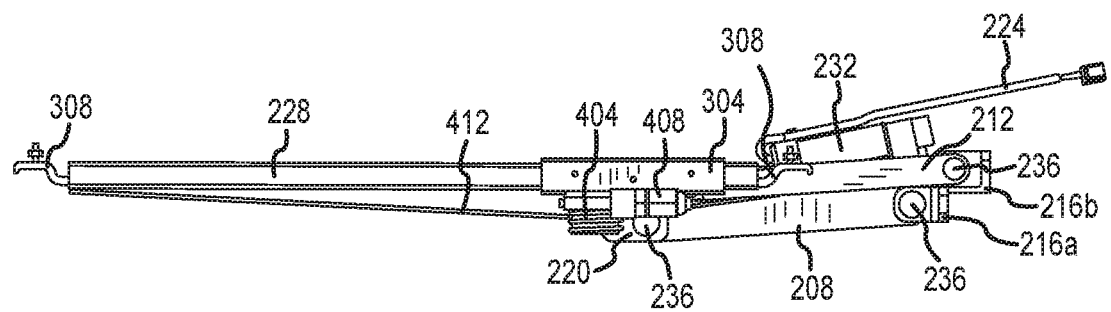
FIG. 4B shows a top view of the articulating mechanism for a vehicle door of FIG. 4A.
Figure 4C:
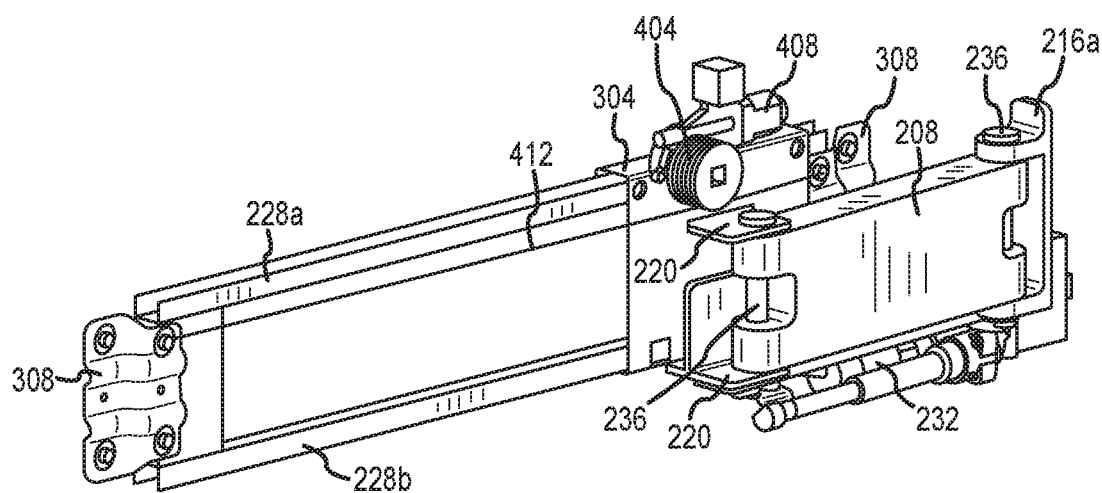
FIG. 4C shows a perspective view of the articulating mechanism for a vehicle door of FIG. 4A.

FIGS. 4A-4C depict an articulating mechanism for a vehicle door according to another embodiment of the present disclosure. The articulating mechanism is shown installed on a vehicle door 204 in FIG. 4A, and as a standalone mechanism in FIGS. 4B and 4C. The articulating mechanism generally comprises the same components as the embodiments of FIGS. 2A-2D and 3A-3C, but also comprises a pulley 404, a pulley motor 408, and a cable 412 for enabling powered sliding of the door 204 along the rails 228*a*, 228*b*. More specifically, the cable 412 is fixedly attached to (or proximate) each end of the rail 228*a*. The pulley motor 408, which is configured to operate in both forward and reverse directions, selectively rotates the pulley 404 in the clockwise and counterclockwise directions, which rotation causes the pulley 404 to pull the trolley 304 (to which the pulley 304 is rotatably attached) along the cable 412 in the forward or backward direction, as appropriate depending on whether the door 204 is being opened or closed. A gearbox may be provided to transfer rotational motion from the pulley motor 408 to the pulley 404, and/or to gain mechanical advantage through the use of different-sized gears and thus permit the use of a less powerful pulley motor 408. Like the actuator 232, the pulley motor 408 may operate in response to activation of a button, switch, or other input mechanism by an occupant or other user of a vehicle such as the vehicle 100.

In some embodiments, the pulley 404, pully motor 408, and cable 412 may be replaced by another mechanism for accomplishing the powered sliding of the door 204. Such a mechanism might be or include, for example, a belt-driven mechanism, an electromechanical strut, a hydraulic cylinder, a motor configured to directly drive a wheel or gear that engages the rail 228*a* or 228*b*, or any other suitable mechanism known in the art.

Although embodiments of the present disclosure have been described as incorporating a 4-bar mechanism for translating a vehicle door away from the vehicle while maintaining the door's alignment in the +X/−X direction, the present disclosure is not limited to the use of such a mechanism. For example, the 4-bar mechanism could be replaced by a single pivot mechanism comprising a cam to control the alignment of the door, or with a 6-bar mechanism.

Other variations of the present disclosure are also possible. While the articulating mechanisms depicted in the figures of the present disclosure permit movement of the door 204 in two dimensions, articulating mechanisms of the present disclosure may also permit or require motion in three dimensions. For example, a four-bar linkage such as that described herein could positioned to rotate upward and/or downward (e.g., in a vertical plane parallel to the Z-axis) rather than forward and/or backward. Such an alignment would still translate a vehicle door 204 away from the vehicle in the +Y/−Y direction. As another example, a four-bar linkage such as that described herein could be positioned to rotate diagonally, such that the rotation thereof has a vertical component as well as a horizontal component, while still translating the vehicle door 204 toward and/or away from the vehicle in the +Y/−Y direction. Still further, the rails 228*a*, 228*b* of an articulating mechanism as described herein need not be installed on the door 204 so as to be parallel to the X-axis. In some embodiments, the rails 228*a*, 228*b* may be affixed to the door 204 in a diagonal configuration, so that the door moves along both the X-axis and the Z-axis when the trolley 304 slides along the rails

228a, 228b, or in a vertical configuration, so that the door moves only along the Z-axis when the trolley 304 slides along the rails 228a, 228b. The rails 228a, 228b may also have a curved shape, and may be curved in one plane or in multiple planes. In some embodiments, the rails 228a, 228b may define a three-dimensional path for moving the door in three dimensions relative to the vehicle body. Regardless of the shape of the rails 228a, 228b, the trolley 304 may be configured to engage the rails 228a, 228b and to slide along the rails 228a, 228b. Additionally, the rails 228a, 228b may comprise one or more detents or stops to secure the door 204 in a desired position (e.g., against the force of gravity). One or more locking features, in addition to or instead of detents, may also be included in some embodiments to hold the door 204 in a desired position (including in a closed position and in one or more open positions).

In some embodiments of the present disclosure, the supporting member 208 and aligning member 212 may comprise a telescoping feature that enables the door 204 to be moved a greater distance away from the vehicle 100 in the +Y/−Y direction. For example, in some embodiments, the supporting member 208 and aligning member 212 may rotate into the opened position, and then telescope along their length to move the door 204 even farther away from the vehicle 100. Other mechanisms for selectively extending the length of the supporting member 208 and the aligning member 212 may also be utilized, including one or more scissor or rhombus linkages, or (particularly in embodiments that use a single pivot mechanism rather than a 4-bar linkage) a folding/unfolding mechanism (e.g., a hinged pivot arm that can move between a folded position having a first length and an unfolded position having a second length greater than the first length).

As persons of ordinary skill in the art will appreciate based on the foregoing disclosure, embodiments of the present disclosure permit independent movement of a vehicle door along separate motion profiles. Even so, movement of the door along these two motion profiles must be at least partially sequential, in that to be opened, the door must be moved away from the vehicle before it can slide relative to the vehicle, and to be closed, the door must slide into the proper position before it can be moved toward the vehicle and into the closed position.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include an articulating mechanism for a vehicle door, comprising: a supporting member having a first end and a second end, the first end pivotably connected to a vehicle frame and the second end pivotably connected to a door bracket; an aligning member having a third end and a fourth end, the third end pivotably connected to the vehicle frame and the fourth end pivotably connected to the door bracket; and a rail secured to a vehicle door, wherein the door bracket is slideably connected to the rail, the supporting member and the aligning member rotate to move the vehicle door toward or away from the vehicle frame without rotating the vehicle door, and the door bracket slides relative to the rail to move the door forward or backward along the vehicle frame.

Aspects of the above articulating mechanism for a vehicle door include: the first end is pivotably connected to the vehicle frame via a frame bracket that is fixedly secured to the vehicle frame; the first end is pivotably connected to the vehicle frame using a pivot pin; the articulating mechanism further comprises an actuator for automatically causing the supporting member and the aligning member to rotate; the actuator is an electromechanical strut; the articulating mechanism further comprises an actuator for automatically causing the door bracket to slide relative to the rail; the actuator comprises a pulley motor driving a pulley; the articulating mechanism further comprises a plurality of rails; the door bracket is slideably connected to the rail via a trolley; and the trolley comprises at least one of a plurality of wheels and a plurality of bearings.

Embodiments also include an articulating mechanism for opening and closing a vehicle door, comprising: a first mechanism having a first motion profile for moving a vehicle door toward and away from a vehicle frame; and a second mechanism having a second motion profile different than the first motion profile for moving the vehicle door along the vehicle frame; wherein opening the vehicle door requires starting the first motion profile before the second motion profile, and closing the vehicle door requires completing the second motion profile before completing the first motion profile, and further wherein an orientation of the vehicle door relative to the vehicle frame does not change, regardless of the position of the vehicle door relative to the vehicle frame.

Aspects of the above articulating mechanism for opening and closing a vehicle door further include: the first mechanism comprises at least one member pivotably connected at one end to the vehicle frame and at another end to a door bracket; the at least one member comprises a supporting member and an aligning member, the supporting member, aligning member, vehicle frame, and door bracket arranged as a 4-bar linkage; the first mechanism further comprises a cam; the second mechanism comprises at least one rail; the second mechanism further comprises a trolley slideably engaged with the at least one rail; the vehicle door is a front door; and the first motion profile comprises rotation and the second motion profile comprises translation.

Embodiments further include an articulating mechanism for moving a vehicle door, comprising: a four-bar linkage comprising: a fixed frame bracket fixedly secured to a vehicle frame, a rotating supporting member, a rotating aligning member, and a door bracket connected to a vehicle door; a sliding mechanism comprising: a plurality of rails fixedly secured to the vehicle door, and a trolley, the trolley fixedly secured to the door bracket and slideably engaged with the plurality of rails; and at least one actuator for causing the rotating supporting member and the rotating aligning member to rotate relative to the fixed frame bracket, and for causing the trolley to slide relative to the plurality of rails, wherein an orientation of the vehicle doors remains substantially constant while a position of the vehicle door changes.

Aspects of the above articulating mechanism for moving a vehicle door include: the plurality of rails is fixedly secured to the vehicle door with a plurality of rail brackets.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

What is claimed is:

1. An articulating mechanism for a vehicle door, comprising:
    a supporting member having a first end and a second end, the first end being pivotably connected directly to a vehicle frame and the second end being pivotably connected to a door bracket, wherein the supporting member supports substantially all of a vehicle door weight;
    an aligning member having a third end and a fourth end, the third end being pivotably connected directly to the vehicle frame and the fourth end being pivotably connected to the door bracket, wherein the aligning member supports substantially none of the vehicle door weight, and wherein the supporting member is larger than the aligning member; and
    a rail secured to a vehicle door,
    wherein the door bracket is slideably connected to the rail, the supporting member and the aligning member rotate to move the vehicle door toward or away from the vehicle frame without rotating the vehicle door, and the door bracket slides relative to the rail to move the door forward or backward along the vehicle frame.

2. The articulating mechanism for a vehicle door of claim 1, wherein the supporting member is a telescoping member.

3. The articulating mechanism for a vehicle door of claim 1, wherein the first end is pivotably connected to the vehicle frame using a pivot pin.

4. The articulating mechanism for a vehicle door of claim 1, further comprising an actuator for automatically causing the supporting member and the aligning member to rotate.

5. The articulating mechanism for a vehicle door of claim 4, wherein the actuator is an electromechanical strut.

6. The articulating mechanism for a vehicle door of claim 1, further comprising an actuator for automatically causing the door bracket to slide relative to the rail.

7. The articulating mechanism for a vehicle door of claim 1, wherein the actuator comprises a pulley motor driving a pulley.

8. The articulating mechanism for a vehicle door of claim 1, further comprising a plurality of rails.

9. The articulating mechanism for a vehicle door of claim 1, wherein the door bracket is slideably connected to the rail via a trolley.

10. The articulating mechanism for a vehicle door of claim 9, wherein the trolley comprises at least one of a plurality of wheels and a plurality of bearings.

11. An articulating mechanism for opening and closing a vehicle door, comprising:
    a first mechanism having a first motion profile for moving a vehicle door toward and away from a vehicle frame, the first mechanism comprising a supporting member and an aligning member, wherein the supporting member is configured to support substantially all of a vehicle door weight and the aligning member supports substantially none of the vehicle door weight, and wherein the aligning member comprises a telescoping feature; and
    a second mechanism having a second motion profile different than the first motion profile for moving the vehicle door along the vehicle frame;
    wherein opening the vehicle door requires starting the first motion profile before the second motion profile, and closing the vehicle door requires completing the second motion profile before completing the first motion profile, and further wherein an orientation of the vehicle door relative to the vehicle frame does not change, regardless of the position of the vehicle door relative to the vehicle frame.

12. The articulating mechanism of claim 11, wherein the first mechanism comprises at least one member pivotably connected at one end directly to the vehicle frame and at another end to a door bracket.

13. The articulating mechanism of claim 12, wherein the at least one member comprises the supporting member and the aligning member, the supporting member, aligning member, vehicle frame, and door bracket arranged as a 4-bar linkage.

14. The articulating mechanism of claim 12, wherein the first mechanism further comprises a cam.

15. The articulating mechanism of claim 11, wherein the second mechanism comprises at least one rail.

16. The articulating mechanism of claim 15, wherein the second mechanism further comprises a trolley slideably engaged with the at least one rail.

17. The articulating mechanism of claim 11, wherein the vehicle door is a front door.

18. The articulating mechanism of claim 11, wherein the first motion profile comprises rotation and the second motion profile comprises translation.

19. An articulating mechanism for moving a vehicle door, comprising:
   a four-bar linkage comprising:
      a vehicle frame,
      a rotating supporting member supporting substantially all of a vehicle door weight,
      a rotating aligning member supporting substantially none of the vehicle door weight, the rotating supporting member being larger than the rotating aligning member and comprising a telescoping feature, and
      a door bracket connected to a vehicle door;
   a sliding mechanism comprising:
      a plurality of rails fixedly secured to the vehicle door, and
      a trolley, the trolley being fixedly secured to the door bracket and slideably engaged with the plurality of rails; and
   at least one actuator for causing the rotating supporting member and the rotating aligning member to rotate relative to the fixed frame bracket, and for causing the trolley to slide relative to the plurality of rails,
   wherein an orientation of the vehicle doors remains substantially constant while a position of the vehicle door changes.

20. The articulating mechanism of claim 19, wherein the plurality of rails is fixedly secured to the vehicle door with a plurality of rail brackets.

* * * * *